May 2, 1961 J. L. MELCHOR ET AL 2,982,909
BROADBAND MICROWAVE FREQUENCY METER
Filed Aug. 22, 1955 2 Sheets-Sheet 1

INVENTORS
JACK L. MELCHOR
PERRY H. VARTANIAN
BY
ATTORNEY

United States Patent Office 2,982,909
Patented May 2, 1961

---

2,982,909

BROADBAND MICROWAVE FREQUENCY METER

Jack L. Melchor, Mountain View, and Perry H. Vartanian, Menlo Park, Calif., assignors, by mesne assignments, to Sylvania Electric Products Inc., Wilmington, Del., a corporation of Delaware Filed Aug. 22, 1955, Ser. No. 529,672

1 Claim. (Cl. 324—.5)

Our invention relates to frequency absorption devices which make use of paramagnetic resonance.

It is known that when a magnetic field is established within certain materials, and a signal of variable frequency is supplied thereto, a certain amount of signal absorption or attenuation will be observed when the signal frequency falls within a given frequency band. This phenomenon is known as paramagnetic resonance absorption. Examples of such materials are manganese dioxide, metallic sodium and certain organic free radicals such as $\alpha,\alpha$-diphenyl $\beta$-picryl hydrazyl.

For any given field intensity, there is only one given frequency band in which this absorption will take place. Moreover, this given band can be varied by varying the magnetic field intensity, so that it is possible to attenuate signals whose frequencies are contained within any selected frequency band.

In spectrum analysis work, this attenuation is indicated by a paragmagnetic resonance absorption line characteristic dependent both upon the particular material used and the intensity of the applied magnetic field.

The absorption line itself can be observed quite readily, but the amount of signal attenuation is extremely small. As a result, as far as is known to us, paragmagnetic resonance absorption has found application only in research work. Commercial use of this phenomenon is dependent upon techniques for detecting these small amounts of signal attenuation.

Accordingly, it is an object of the present invention to develop techniques for detecting signal attenuation or absorption caused by materials exhibiting paramagnetic resonance absorption.

Another object is to provide a spectrum analyzer which employs paramagnetic resonance absorption.

Still another object is to provide a frequency responsive signal detection element which employs paramagnetic resonance absorption.

A further object is to detect signal attenuation or absorption in a material exhibiting paramagnetic absorption by means of an alternating magnetic field superimposed upon a constant magnetic field.

Still a further object is to provide a novel signal attenuation or absorption device employing paramagnetic resonance absorption.

These and other objects of our invention will either be explained or will become apparent to those skilled in the art when this specification is studied in conjunction with the accompanying drawings wherein.

In our invention a section of a hollow coaxial transmission line or wave guide is packed with hydrazyl, $(C_6H_5)_2N$—$NHC_6H_2(NO_2)_3$ or other material which exhibits paramagnetic resonance absorption. The section itself will pass a broad band of frequencies. A first coil is wound tightly around the section and the resulting structure is inserted within a second and larger coil. The second coil is coupled to a suitable direct current source to establish a constant magnetic field, called the main field, of given intensity within the second coil and the line section. The first coil is coupled to a signal generator producing a control or modification signal of small amplitude and of given frequency to establish an alternating magnetic field, called the control or auxiliary field, within the section, which is superimposed on the main field. The intensity of the auxiliary field is small in comparison with the main field so that the incremental variations in total field intensity are also small.

Incoming signals are supplied to one end of the section and an output signal appears at the other end of the section.

When the intensity of the main field is held constant, a particular absorption line frequency band is established for the hydrazyl section. As the incoming signal is varied in frequency, the output signal will be unattenuated and substantially identical with the incoming signal until the signal frequency approaches the frequency region defined by the absorption line. For signal frequencies adjacent each end of the region, the output signal will be differentially attenuated at a rate corresponding to the frequency of the current in the control field, and for signals at the center of the region the output signal will have constant attenuated value with no alternating components. When devices such as a detector responsive to the differentially attenuated signal are coupled to the detected output of the hydrazyl filled section, the resultant apparatus can be used as selectively responsive signal detection apparatus.

On the other hand, if one or more signals of unknown frequency are supplied to the input of the filled section, and the main field intensity is varied in predetermined manner, thereby varying the absorption line accordingly, the resultant apparatus can be used as a spectrum analyzer or as a search radar receiver.

Figure 1:
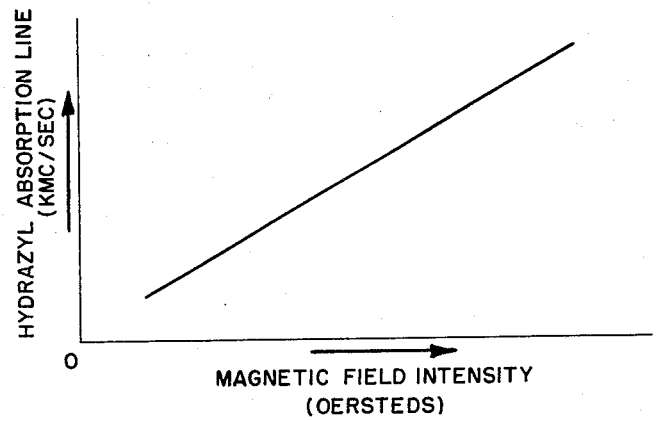
Fig. 1 is a graph showing the relation between the paramagnetic resonance absorption line of hydrazyl and the intensity of the applied magnetic field.

Referring now to the drawings, Fig. 1 shows the relation, for hydrazyl, between the paramagnetic resonance absorption line expressed in thousands of megacycles per second and the intensity of an applied magnetic field expressed in oersteds. It will be apparent that these two variables are linear functions of each other. The width or frequency band of the absorption line is on the order of 4 to 8 megacycles per second; this width is negligible for the frequency range indicated. Consequently, each absorption line is defined by one corresponding frequency.

Figure 2:
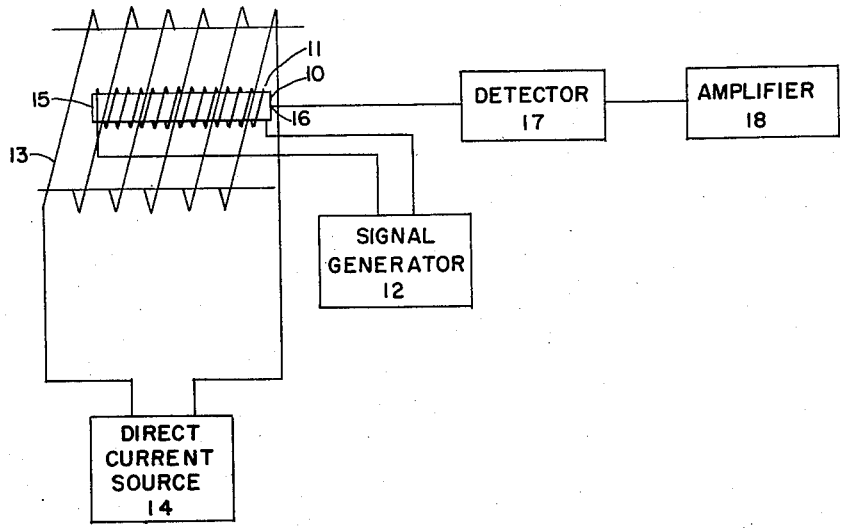
Fig. 2 illustrates a preferred embodiment of a signal differential attenuator in accordance with our invention.

In the diagram shown in Fig. 2, a broad band coaxial transmission line section filled with hydrazyl is identified at 10. A first solenoid or coil 11 is tightly wound about the surface of section 10 and is coupled to a signal generator 12 which supplies a low frequency alternating signal (a modulating signal) thereto. This signal has a relatively small constant amplitude and is used to establish an auxiliary or control magnetic field within section 10. A typical operating frequency for this signal can be 1000 cycles per second, but this frequency can be sharply increased beyond this value to frequencies on the order of 100 megacycles.

A second solenoid or coil 13 surrounds coil 11 and is connected to a direct current source 14 whereby a main magnetic field is established within section 10. The intensity of the main field is very much higher than that of the auxiliary field.

Incoming signals are supplied to an input end 15 of section 10. The output end 16 of section 10 is connected through a broad band amplitude sensitive detector 17 to the input of amplifier 18. This amplifier is tuned to the frequency of generator 12.

Figure 3:
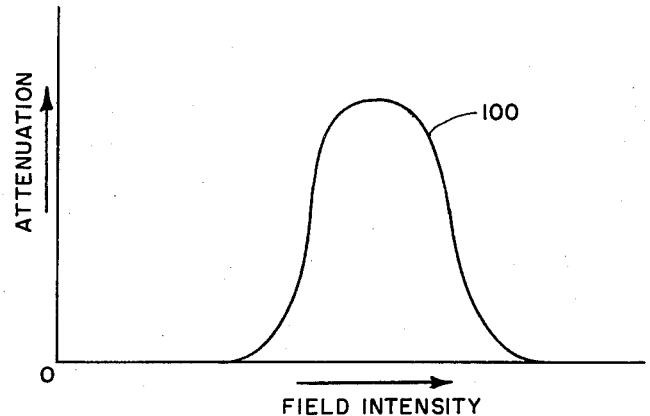
Figs. 3 and 4 are graphs which illustrate the operation of the attenuator shown in Fig. 2.

When the signal frequency is held within a given range which defines a given absorption line, and the intensity of the main field is gradually increased, for example by gradually increasing the current in coil 13, the signal attenuation or absorption will be substantially zero for field intensities which do not correspond to the intensity defining the given lines as shown in Fig. 3. When the field intensity approaches this corresponding intensity, the attenuation rapidly increases, attaining a small constant value where the applied intensity is equal to this corresponding intensity. This zone or region of attenuation variation is defined by the flat topped curve 100 in Fig. 3.

It will be noted that for any given field intensity falling outside of the region defined by curve 100, the incremental variations in the total field intenstiy caused by the alternating auxiliary field have no effect on attenuation.

However, within the region defined by the rapidly rising and falling portions of the curve 100, these incremental variations have a very large effect because of the high rate of change of attenuation. Expressed in other words, the incoming signal is amplitude modulated in this area. Within the region of the flat portion of the curve 100, there is constant attenuation, but the incremental variations have no effect and the incoming signal is again unmodulated.

Figure 4:
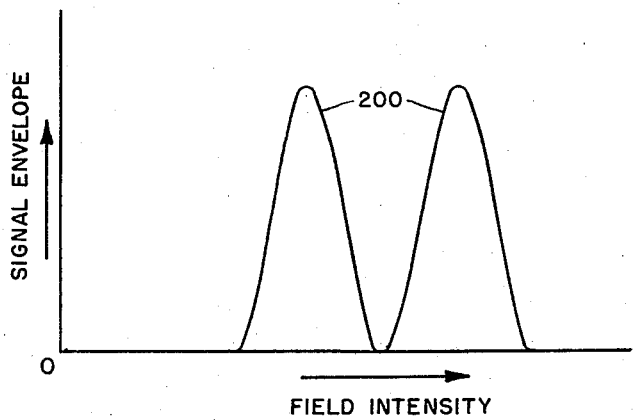

Accordingly, the alternating component of the modulation envelope of the signal appearing at the output end 16 of section 10 has the magnitude indicated in Fig. 4. The double peaks in the curve 200 shown in Fig. 4 correspond to the portions of curve 100 which have the highest rate of change. The null or minimum between the two peaks corresponds to the region of high constant attenuation in curve 100 and indicates that the exact field intensity has attained a value which corresponds to the original given absorption line corresponding to the incoming signal frequency as shown in Fig. 1.

The signal appearing at output end 16 is applied through detector 17 to amplifier 18. Detector 17 detects the signal in conventional manner. Since amplifier 18 is tuned to the frequency of the modulating signal, it responds only to this modulation envelope and no other. The amplified signal yielded by the amplifier has the general wave form indicated in Fig. 4.

If this amplified output signal is supplied to the vertical or horizontal plates of an oscilloscope while a voltage proportional to the main field current is supplied to the horizontal or vertical plates, the cathode ray display will present a spectrum analysis of the incoming signal.

Alternatively, if the field intensity is held constant while the frequency of the incoming signal is varied, the arrangement of Fig. 2 can be used to detect all signals whose frequencies correspond to the absorption line established by the constant field intensity.

The hydrazyl used in the filled section 10 is a black poly-crystalline powder. Single crystals can be used. Indeed, single crystals will improve the resolution of the system (i.e., narrow the width of the absorption line).

If discontinuous or pulse type incoming signals are used instead of the continuous wave signals previously indicated, it is necessary that the frequency of the modulating signal be sufficiently high to prevent the tuned amplifier from responding to harmonics of the pulse envelope. For example, if 1 microsecond pulses are present, the modulating signal frequency must be on the order of 100 megacycles per second or higher.

If a fixed intensity main field is to be used, a permanent magnet can be used instead of the solenoid coil previously indicated.

While in Fig. 2 we have used parallel magnetic fields, the molecular orientation within the hydrazyl is sufficiently random to permit the use of orthogonal fields. Consequently, an electromagnet can also be used to replace the solenoid. The use of an electromagnet has the disadvantage that the absorption line varies linearly with the field intensity only within the linear portion of the magnetization curve and calibration is required if the non-linear portions of this curve must be used. Further, because of hysteresis effects, the main field intensity must be either continuously increased or continuously decreased; i.e., the direction of sweep cannot be reversed. The change in intensity can be accomplished, for example, by using a sawtooth excitation voltage which is blanked during retrace.

Of course, other paramagnetic materials can be used. However, at the present time, hydrazyl exhibits the strongest and sharpest paramagnetic resonance absorption line thus far reported.

While the frequency ranges of the incoming signals thus far described have been on the order of thousands of megacycles, hydrazyl has been used with incoming signals having frequencies on the order of 30 megacycles.

If the incoming signal is sufficiently amplified, for example, through the use of a broad band pre-amplifier, the apparatus of Fig. 2 can be used as a broad band search receiver. The modulating frequency, being a constant, can be detected through the use of a suitably tuned receiver located in the vicinity of the search receiver. In order to prevent the device from responding to the envelope of the incoming signal, the modulation frequency can be varied in some predetermined manner. In this situation it is necessary to vary the pass band of the amplifier 18 in the same manner so that this amplifier will always respond to the applied modulation envelope even though the modulation frequency is variable.

While we have shown and described and pointed out our invention as applied above, it will be apparent to those skilled in the art that many modifications can be made within the scope and sphere of our invention as defined in the claim which follows.

What is claimed is:

Apparatus for analyzing the frequency spectrum of a microwave signal comprising, in combination, a section of coaxial transmission line possessing broadband transmission characteristics to one end of which said microwave signal is applied, said section of coaxial line containing in the region between its conductors a material selected from the group exhibiting a paramagnetic resonance absorption line width of less than eight megacycles per second, means for producing a unidirectional magnetic field in said material variable over a range of intensities which includes intensities to cause resonance absorption at the frequencies included in said microwave signal, means for producing an incremental magnetic field in said material of substantially lower intensity than the intensity of said unidirectional field and alternating at audio frequency to cause said microwave signal to be amplitude modulated at said audio frequency when the frequency of said signal is so related to the intensity of said unidirectional field that resonance absorption occurs, a detector coupled to the other end of said section of line for detecting the envelope of said amplitude modulated microwave signal, and an amplifier coupled to said detector and tuned to said audio frequency for selectively amplifying said detected signal.

(References on following page)

References Cited in the file of this patent

UNITED STATES PATENTS

| | | | |
|---|---|---|---|
| 2,051,537 | Wolff et al. | Aug. 18, 1936 |
| 2,561,489 | Block | July 24, 1951 |
| 2,820,944 | Bradley | Jan. 21, 1958 |

OTHER REFERENCES

Electronics, April 1953, pp. 184–187.

Physical Review, May 15, 1951, vol. 82, No. 4; pp. 507–510.

Bell Laboratories Record, April 1953, vol. 31, No. 4, pp. 121–126.

The Review of Scientific Instruments, January 1955, vol. 26, No. 1, pp. 34–41.

Feher et al.: Physical Review, vol. 98, No. 2, April 15, 1955, pages 337 to 348.

Brown: Physical Review, vol. 78, No. 5, pages 530–532, June 1, 1950.

Darrow: Electrical Engineering, vol. 70, No. 5, pp. 401–404, May 1951.

Hogan: Bell System Technical Journal, vol. 31, No. 1, January 1952.

Technical News Bulletin of the National Bureau of Standards, August 1951, pp. 110 and 111.

Electronic Engineering, November 1952, page 506.

Proc. of I.R.E., vol. 41, No. 7, July 1953, p. 937.

Radio Electronic Engineering, April 1953, pp. 12, 13, 14 and 24.

The Review of Scientific Instruments, February 1952, vol. 23, Issue No. 2, pp. 75–77.